(12) United States Patent
Park

(10) Patent No.: US 6,259,472 B1
(45) Date of Patent: *Jul. 10, 2001

(54) HISTOGRAM EQUALIZATION APPARATUS FOR CONTRAST ENHANCEMENT OF MOVING IMAGE AND METHOD THEREFOR

(75) Inventor: Yung-jun Park, Kunpo (KR)

(73) Assignee: Samsung Electronics Co., Ltd., Kyungki-Do (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/973,968

(22) PCT Filed: Jun. 17, 1997

(86) PCT No.: PCT/KR97/00116

§ 371 Date: Apr. 22, 1998

§ 102(e) Date: Apr. 22, 1998

(87) PCT Pub. No.: WO97/49064

PCT Pub. Date: Dec. 24, 1997

(30) Foreign Application Priority Data

Jun. 20, 1996 (KR) .................................................. 96-22594

(51) Int. Cl.⁷ ....................................................... H04N 5/20
(52) U.S. Cl. ............................ 348/28; 382/170; 382/172; 382/173; 382/181; 382/190
(58) Field of Search ...................... 348/28, 672; 382/168, 382/6, 274, 169, 171, 264; 358/111

(56) References Cited

U.S. PATENT DOCUMENTS

| | | | | |
|---|---|---|---|---|
| 4,680,628 | * | 7/1987 | Wojcik et al. | 358/111 |
| 5,164,993 | * | 11/1992 | Capozzi et al. | 382/6 |
| 5,862,254 | * | 1/1999 | Kim et al. | 382/168 |
| 5,937,090 | * | 8/1999 | Kim | 382/169 |
| 5,963,665 | * | 10/1999 | Kim et al. | 382/169 |
| 5,995,656 | * | 11/1999 | Kim | 382/169 |

* cited by examiner

Primary Examiner—Chris Kelley
Assistant Examiner—Shawn S. An
(74) Attorney, Agent, or Firm—Sughrue, Mion, Zinn, Macpeak & Seas, PLLC

(57) ABSTRACT

A histogram equalization apparatus for contrast enhancement of a moving image includes a CDF calculator for counting the number of pixels having a gray level from the minimum to the maximum or less with respect to an input image in a frame unit to calculate a cumulative distribution function (CDF) value of each gray level, and a look-up table for updating histogram-equalized level corresponding to each gray level of the input moving image in a frame unit based on the CDF value of each gray level, and outputting a corresponding histogram-equalized level according to a level of the input moving image. Therefore, the histogram equalization apparatus can perform real-time histogram equalization on a moving image with a simple hardware, without using a frame memory, a probability density function (PDF) calculator and dividers for a cumulative density function (CDF) calculation.

11 Claims, 6 Drawing Sheets

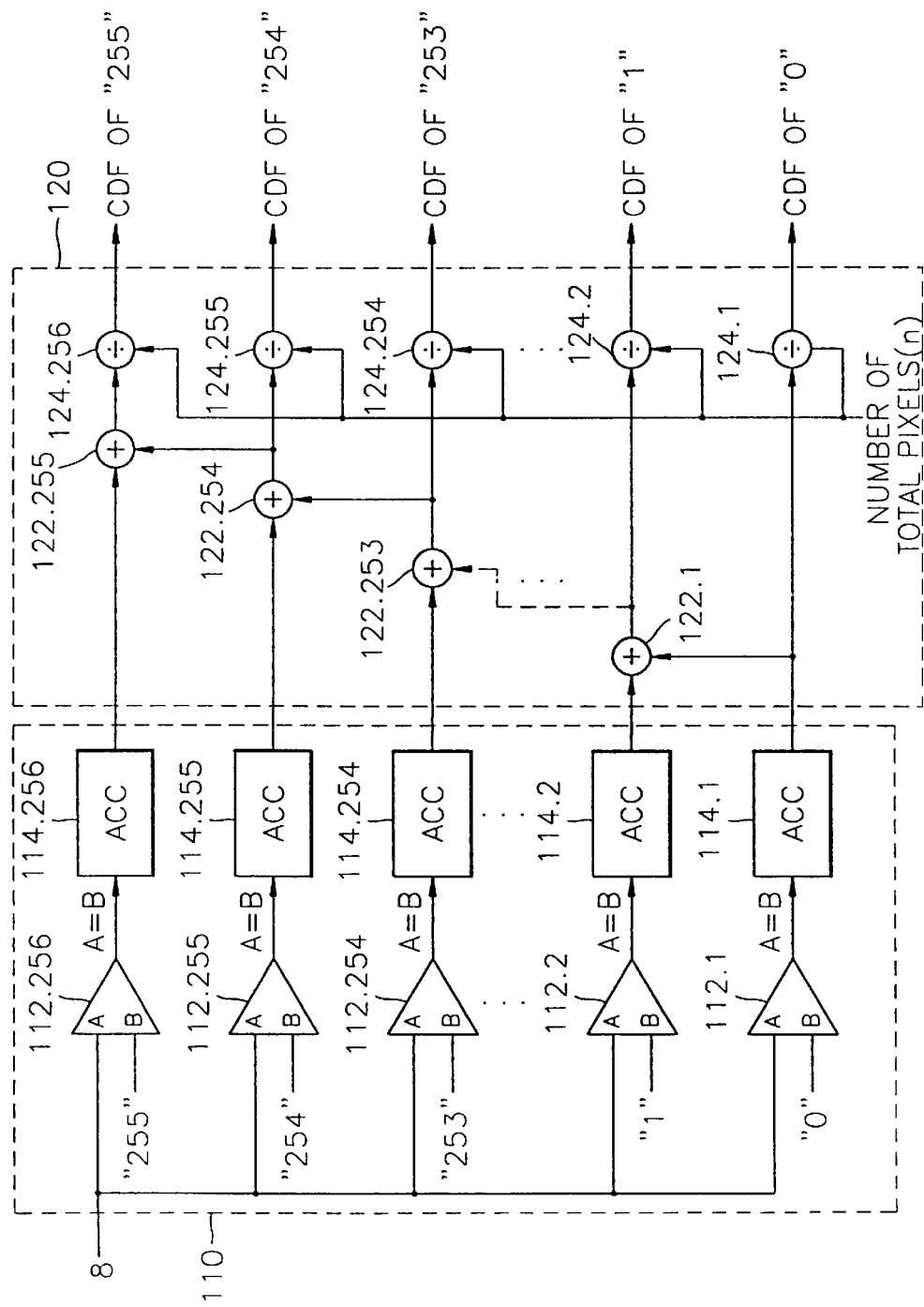

HISTOGRAM EQUALIZATION APPARATUS FOR CONTRAST ENHANCEMENT OF MOVING IMAGE AND METHOD THEREFOR

TECHNICAL FIELD

The present invention relates to a histogram equalization apparatus for contrast enhancement of a moving image and a method therefor, and more particularly, to a histogram equalization apparatus having a simple hardware and a method therefor.

BACKGROUND ART

The histogram of gray levels provides an entire description of the appearance of an image. Gray levels properly controlled with respect to a given image enhances the appearance or contrast of the image.

Histogram equalization is the most widely used and well-known among the methods for contrast enhancement. A method for enhancing the contrast of a given image according to the sample distribution of the image is disclosed in the following references: [1] J. S. Lim, "*Two-Dimensional Signal and Image processing*", Prentice Hall, Englewood Cliffs, N.J., 1990, [2] R. C. Gonzalez and P. Wints, "*Digital Image Processing*," Addison-Wesley, Reading, Mass. 1977.

Generally, since histogram equalization (so-called "distribution equalization") has an effect for expanding the dynamic range, histogram equalization flattens the gray level distribution of the resultant image, so that the contrast of the image is enhanced.

Particularly, the histogram equalization in a medical engineering field as a method for distinct contrast between pixels of an image which is picked up indistinctly is very important in the recognition of the image.

Here, a typical histogram equalization method will be described briefly.

A given image $\{X\}$ is composed of L discrete gray levels $\{X_0, X_1, \ldots, X_{L-1}\}$. Here, $X_0=0$ represents a black level, and $X_{L-1}=1$ represents a white level.

A probability density function (PDF) is defined by the following formula (1).

$$p(X_k) = \frac{n_k}{n}, \text{ for } k = 0, 1, \ldots, L-1 \quad (1)$$

Here, $n_k$ represents the frequency of the grays level $(X_k)$ in the image $\{x\}$, and n represents the number of total samples (pixels) in the image $\{X\}$. Also, a cumulative distribution function (CDF) is defined by the following formula (2).

$$c(X_k) = \sum_{j=0}^{k} p(X_j) \quad (2)$$

An output (Y) of the typical histogram equalization with respect to an input sample $(X_k)$ of the given image is obtained by the following formula (3) based on the CDF.

$$Y = c(X_k)X_{L-1} \quad (3)$$

The histogram equalization method will be described in detail with reference to FIGS. 1 through 3.

FIG. 1 shows an example of a PDF of a specific image. That is, a luminance signal with a brightness of 0~255 gray levels is input, the number of pixels at each gray level is then counted, and the result is divided by the total number of pixels to obtain the result shown in FIG. 1.

FIG. 2 shows a curve of the CDF obtained, based on the PDF of FIG. 1. For example, when the value of the CDF corresponding to the gray level "100" at the point P is 0.875, which indicates that the number of pixels corresponding to 100 or less gray levels is 87.5% with respect to the input image.

FIG. 3 shows the PDF of the image passed through histogram equalization based on the CDF shown in FIG. 2. That is, the level of the output signal (Y) after histogram-equalizing an input pixel $Y_{IN}$ is mapped into a level by the following formula (4).

$$Y = \text{CDF value corresponding to } Y_{IN} \times \text{the maximum gray level } (X_{L-1}) \quad (4)$$

For example, the output gray level after the input pixel having the gray level "100" has been histogram-equalized is mapped into 224 (=0.875×255) levels.

If the input image signal is an analog signal, the new PDF has a straight line (uniform distribution curve) having about 0.004 (=1/256) levels over the whole interval, like Q of FIG. 3. However, if the input image signal is a digital signal, the histogram equalization is performed to a quantized level, and the result of FIG. 3 is obtained. That is, assuming that the output gray level based on the CDF value (0.37) of FIG. 2 is mapped into about "95" when the input gray level is "51", and the output gray level based on the CDF value (0.47) of FIG. 2 is mapped into about "120" when the input gray level is "52", the output gray level of the input image signal having a gray level between "51" and "52" should be mapped into between about 95 and 120. However, a gray level between "51" and "52" does not exist when quantization is performed, so that a uniform distribution curve cannot be obtained.

Thus, as can be seen from FIGS. 1 and 3, the luminance level of the input image concentrated between the gray levels "50" and "100" is mapped into an extended luminance level having the gray levels between 10 and 200, so that the contrast is enhanced.

However, the above-described histogram equalization method has been applied to a still image to improve the image recognition capability and the contrast of the still image due to its problems related to the processing time required for obtaining the values of PDF and CDF and the hardware thereof, which causes a problem in that a frame memory for storing a frame image and a hardware-rich dividing circuit for real-time processing are required when being applied to a moving image.

DISCLOSURE OF THE INVENTION

To solve the above problems, it is an object of the present invention to provide a histogram equalization apparatus for contrast enhancement of a moving image using a simple hardware.

It is another object of the present invention to provide a method for enhancing contrast by performing a real-time histogram equalization on a moving image such as a TV or VCR video signal.

To achieve the first object, there is provided a histogram equalization apparatus for contrast enhancement of a moving image expressed by a predetermined number of gray levels. In the histogram equalization apparatus, a calculator counts the number of pixels having a gray level from the minimum to the maximum or less with respect to an input image in units of a frame to calculate a cumulative distribution function (CDF) value of each gray level, and a memory updates histogram-equalized levels corresponding to each gray level of the input moving image in units of a frame based on the CDF value of each gray level, and outputs a corresponding histogram-equalized level according to a level of the input moving image.

To achieve the second object, there is provided a histogram equalization method for contrast enhancement of a moving image expressed by a predetermined number of gray levels, comprising the steps of: (a) counting the number of pixels having a gray level from the minimum to the maximum or less with respect to an input moving image in units of a frame to output a CDF value of each gray level; and (b) multiplying the CDF value corresponding to the gray level of the input moving image by the maximum gray level to output a histogram-equalized level.

BRIEF DESCRIPTION OF THE DRAWINGS

FIG. 5 is a detailed circuit diagram of the PDF calculator and the CDF calculator of FIG. 4;

BEST MODE FOR CARRYING OUT THE INVENTION

Prior to describing an embodiment of the present invention, a conventional histogram equalization apparatus for contrast enhancement of a moving image will be described with reference to FIGS. 4 through 6B.

Figure 1:
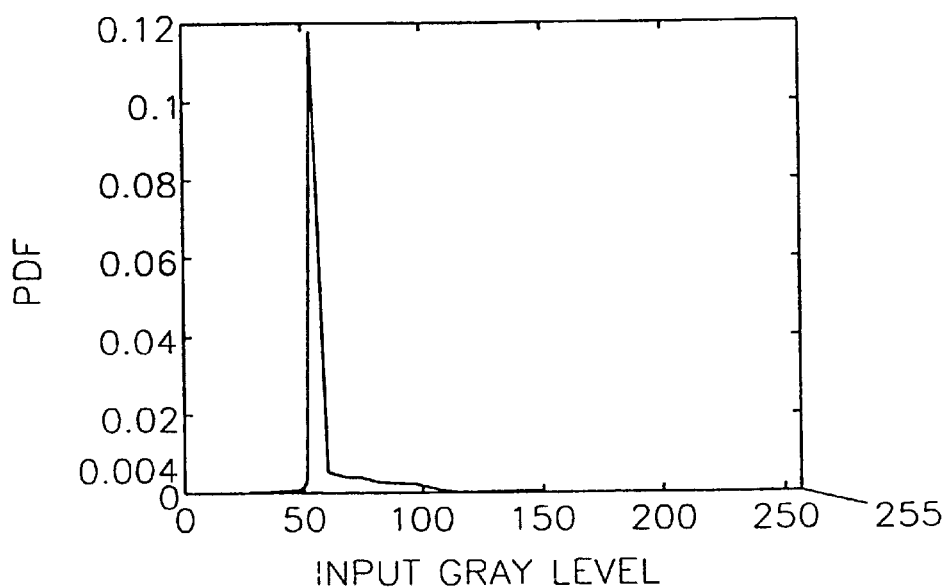
FIG. 1 is a diagram showing an example of a probability density function (PDF) of a specific image.
Figure 2:
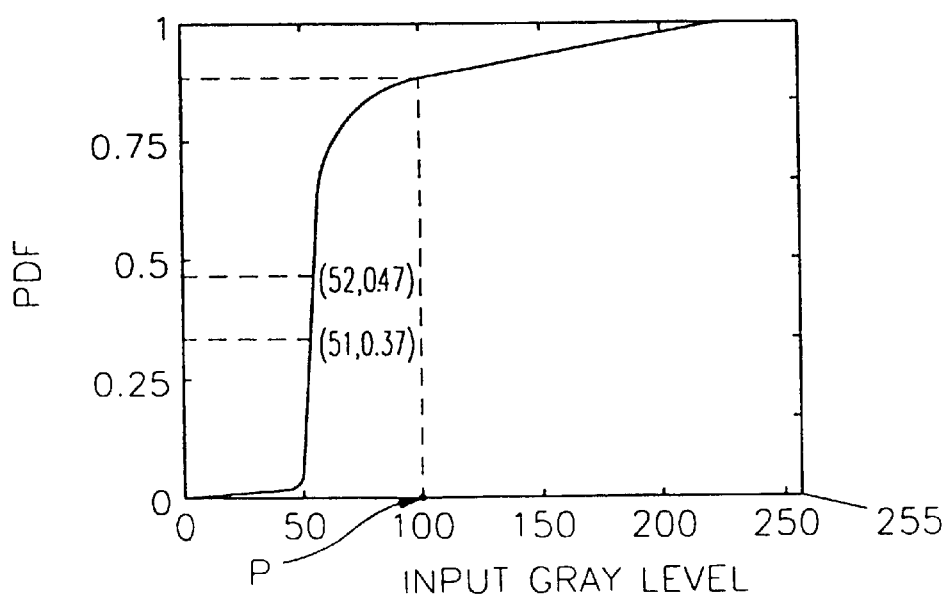
FIG. 2 is a diagram showing a curve of a cumulative distribution function (CDF) based on the PDF of FIG. 1.
Figure 3:
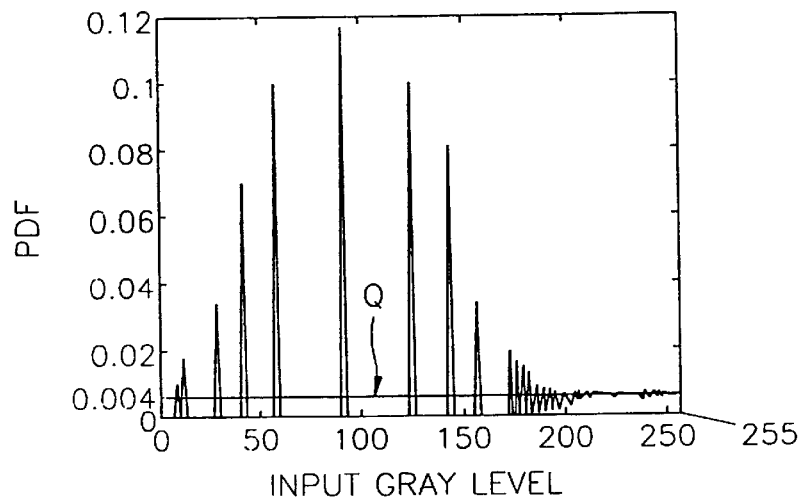
FIG. 3 is a diagram showing the PDF of an image which is histogram-equalized based on the CDF of FIG. 2.
Figure 4:
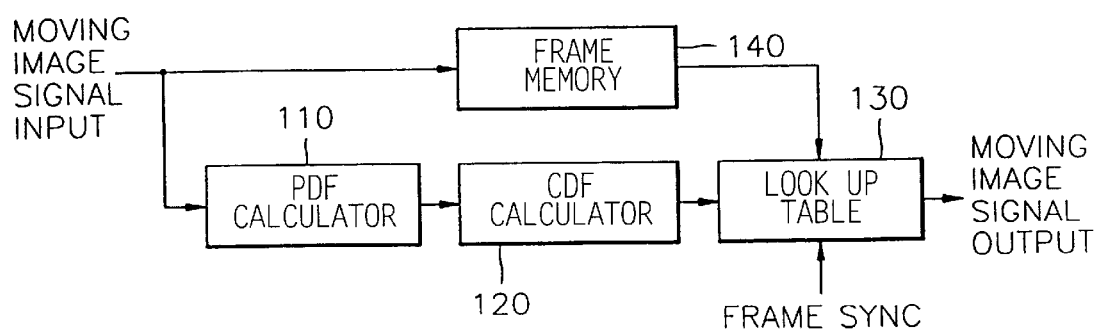
FIG. 4 is a circuit diagram of a conventional histogram equalization apparatus for contrast enhancement of a moving image.

The conventional histogram equalization apparatus of FIG. 4 includes a probability density function (PDF) calculator 110, a cumulative density function (CDF) calculator 120, a look-up table 130 and a frame memory 140.

In FIG. 4, the PDF calculator 110 calculates the PDF by counting the number of input pixels having a gray level between 0 and 255 during one frame of an active picture area (720 pixels×480 lines in the case of the NTSC) when an 8-bit signal passed through the A/D conversion is input.

The CDF calculator 120 calculates the CDF based on the calculated PDF, and includes a plurality of adders and a plurality of dividers.

FIG. 5 is a detailed diagram of the PDF calculator 110 and the CDF calculator 120 of FIG. 4.

In FIG. 5, each comparator 112.1~112.256 of the PDF calculator 110 compares an input pixel with each gray level from a minimum "0" to a maximum "255".

For example, the comparator 112.1 compares the input pixel with the gray level "0" and outputs a "high (1)" signal if the input pixel is equal to the gray level to accumulate the output in an accumulator 114.1. The comparator 112.2 compares the input pixel with the gray level "1" and outputs a "high (1)" signal if the input pixel is equal to the gray level "1" to accumulate the output in an accumulator 114.2. The above comparison and accumulation are repeated by each comparator and accumulator. Finally, a comparator 112.256 compares the input pixel with the gray level "255" and outputs a "high (1)" signal if the input pixel is equal to the gray level "255" to accumulate the output in an accumulator 114.256.

Thus, the counted number of input pixels of each gray level from "0" to "255" during the active picture area of an input frame image, that is, a probability of existence of pixel in each gray level of one frame image, is accumulated in each accumulator 114.1~114.256, so that the output of each accumulator 114.1~114.256 becomes PDF multiplied by the number of total pixels.

On the other hand, each adder 122.1~122.255 of the CDF calculator 120 outputs a value corresponding to the number of pixels per frame having a gray level of "1" or less through the number of pixels having a gray level of "255" or less, respectively.

For example, the adder 122.1 sums the output of the accumulator 114.1 and the output of the accumulator 114.2 to output the sum of the products (PDF×the number of total pixels) for gray levels between "0" and "1." Also, the adder 122.254 sums the output of the accumulator 114.255 and the output of the adder 122.253, which corresponds to the sum of the products (PDF×the number of total pixels) for the gray levels between "0" and "254." The adder 122.255 sums the output of the accumulator 114.256 and the output of the adder 122.254, which corresponds to the sum of the products (PDF×the number of total pixels) for the gray levels "0" between "255." The CDF values from the gray level "0" to "255" are output from each divider 124.1~124.256.

For example, the divider 124.1 divides the number of pixels having the gray level "0" output from the accumulator 114.1 by the number of total pixels n, and the divider 124.2 divides the number of pixels having a gray level of "1" or less per frame output from the adder 122.1 by the number of total pixels n, and the divider 124.256 divides the number of pixels having a gray level of "255" or less per frame output from the adder 124.255 by the number of total pixels n.

As a result, the values obtained by multiplying new CDFs obtained for one frame output from each divider 124.1~124.255, that is, CDFs corresponding to input levels by the maximum gray level "255," are stored in the look-up table 130 of FIG. 4.

Figure 6A:
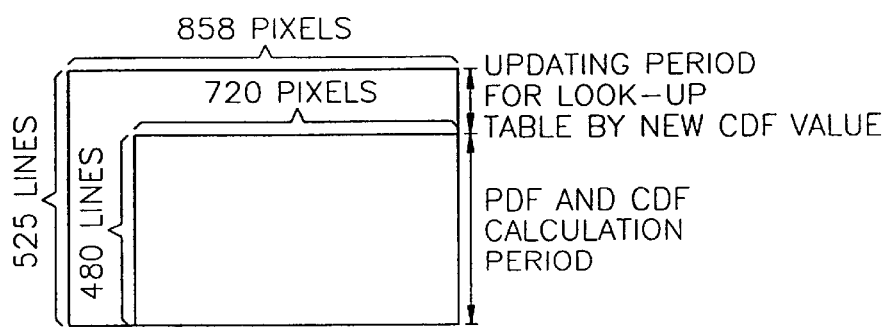
FIG. 6A is a diagram showing one frame of an NTSC image.

FIG. 6A shows a standard image format in the NTSC mode of the NTSC CCIR 601 having a size of 858 pixels× 525 lines. In this frame image format, the active picture area used in the PDF calculator 110 and the CDF calculator 120 has a size of 720 pixels×480 lines, and the number of total pixels n thereof is equal to 720×480.

Figure 6B:
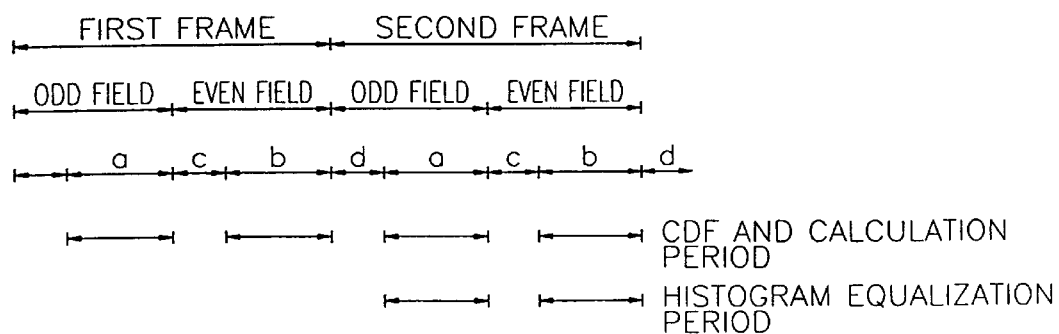
FIG. 6B is a timing diagram of the circuit shown in FIG. 4.

On the other hand, a period for updating the CDF value of a new frame calculated by the CDF calculator 120 according to a frame synchronous signal (FRAME SYNC) in the look-up table 130 shown in FIG. 4 corresponds to "d"

of FIG. 6B. Here, the period "d" is a vertical blanking period of a real image signal, which is not displayed on the screen. Thus, even though the value stored in the look-up table 130 is updated with the CDF value of the new frame for the period "d", the frame is not affected. The periods "a" and "b" of FIG. 6B are sampling periods for the PDF and CDF calculations, and simultaneously histogram equalization periods, and the period "c" is a period without operation. Here, the frame synchronous signal FRAME SYNC input to the look-up table 130 is a control signal representing the vertical blacking period "d" of the first field.

A value obtained by multiplying the CDF value corresponding to the gray level of the input pixel output from the frame memory 140 by the maximum gray level is output from the look-up table 130 storing the value obtained by multiplying the updated CDF value by the maximum gray level.

Here, in order to perform histogram equalization on the frame data statistically processed by the PDF calculator 110 and the CDF calculator 120, an input image signal is delayed by one frame by the frame memory 140.

However, the correlation between the previous frame and the current frame is above 0.95 in consideration of the characteristics of the moving image, so that the histogram equalization can be performed without problems even though the CDF obtained in the previous frame is applied intact to the current frame without using the hardware-rich frame memory.

When the frame changes suddenly, histogram equalization is not performed. However, it can be seen from experimentation that the image distortion of about one frame (1/30 sec) is not detected due to the afterimage effect of the human eye.

Therefore, a histogram equalization apparatus having a simple hardware is proposed by the present invention, in which the CDF is directly calculated from the input pixel without calculating the PDF, so that a frame memory, an PDF calculator, and dividers of the CDF calculator which require much hardware can be omitted.

Figure 7:
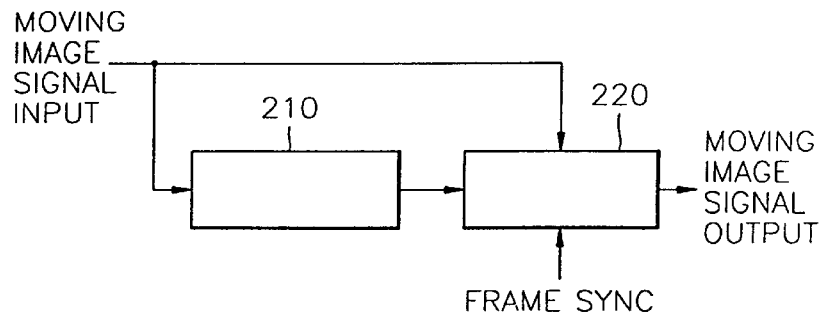
FIG. 7 is a block diagram of a histogram equalization apparatus for contrast enhancement of a moving image according to a preferred embodiment of the present invention.

FIG. 7 is a circuit diagram of a histogram equalization apparatus for contrast enhancement of a moving image according to a preferred embodiment of the present invention.

The histogram equalization apparatus of the present invention includes a CDF calculator 210 and a look-up table 220.

In FIG. 7, the CDF calculator 210 directly calculates the CDF value from the input image signal with respect to each gray level=0, gray level≦1, ..., gray level≦128, ..., and gray level≦255.

Figure 8:
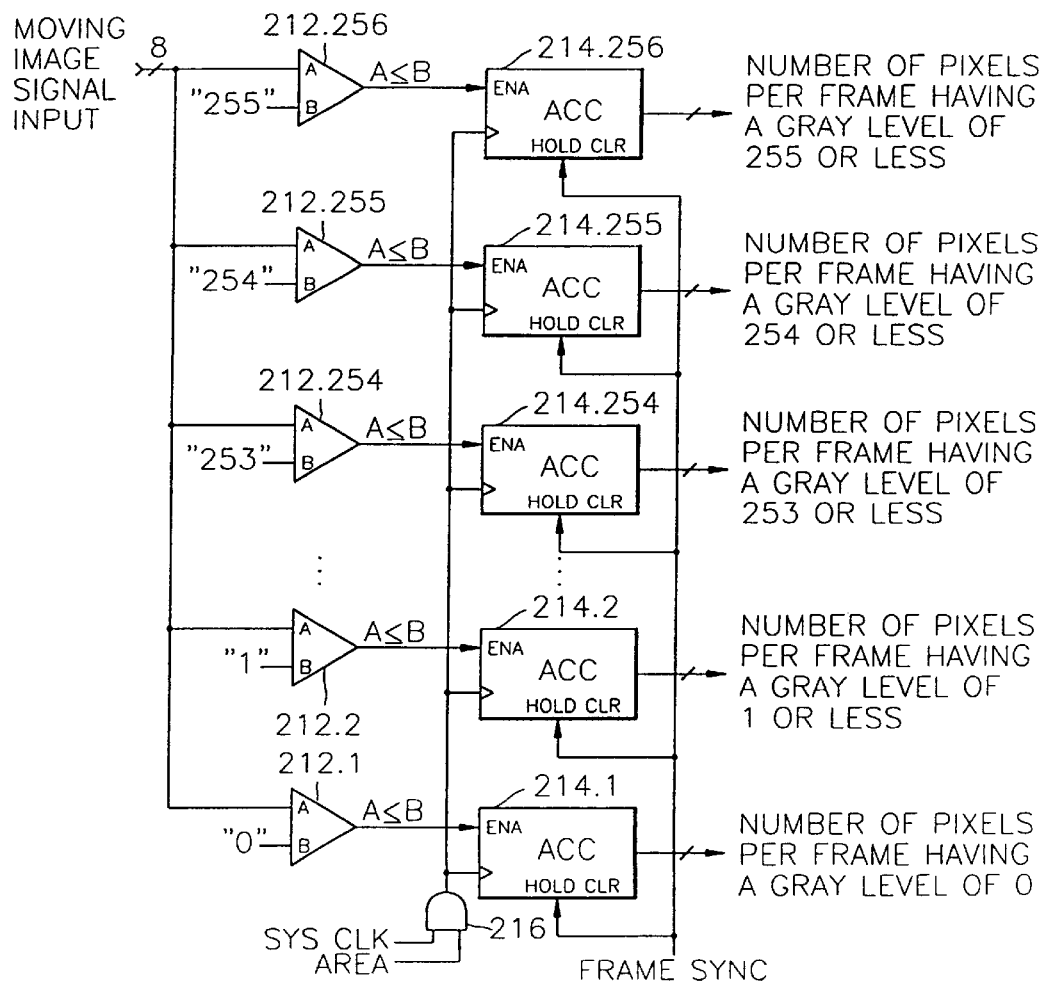
FIG. 8 is a detailed circuit diagram of the CDF calculator of FIG. 7.

A detailed circuit diagram of the CDF calculator 210 is shown in FIG. 8.

In FIG. 8, each comparator 212.1~212.256 compares an input pixel with a respective gray level from "0" to "255". That is, the comparator 212.256 outputs a signal "1" when a pixel having a gray level of "255" or less is input, the comparator 212.255 outputs a signal "1" when a pixel having a gray level of "254" or less is input, and the comparator 212.1 outputs a signal "1" when a pixel having the gray level "0" is input.

Each accumulator 214.1~212.256 increases by one if the output of each comparator 212.1~212.256 input to each enable port ENA is equal to "1" whenever a clock signal (CLK) is input, and outputs the currently accumulated value when a frame synchronous signal (FRAME SYNC) is input to each hold & clear port to clear the accumulated value to "0."

The clock signal (CLK) input to each accumulator 214.1~241.256 is obtained by AND-operating a system clock signal (SYS CLK) and an area control signal (AREA) representing an CDF calculation area in an AND gate 216.

For example, a signal output from the accumulator 214.256 represents the number of pixels having a gray level of "255" or less per frame, a signal output from the accumulator 214.255 represents the number of pixels having a gray level of "254" or less per frame, and a signal output from the accumulator 214.1 represents the number of pixels having the gray level "0" per frame.

Figure 9:
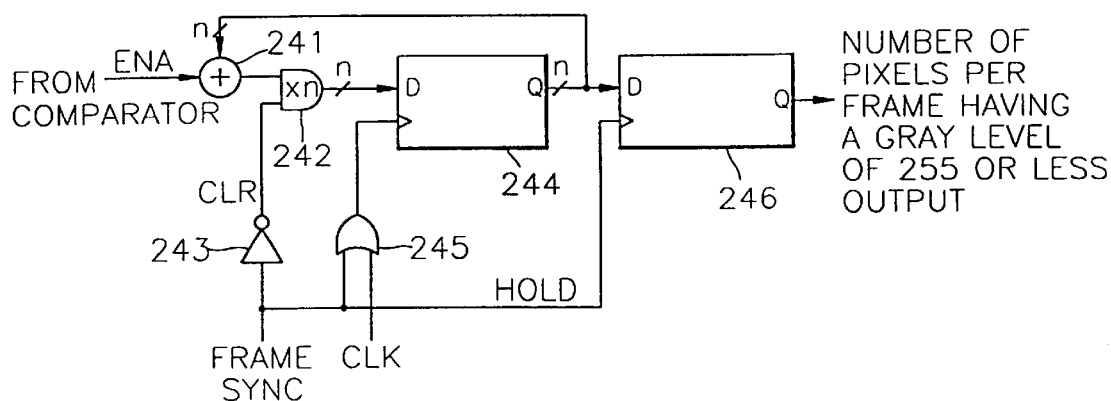
FIG. 9 is a detailed circuit diagram of the accumulator of FIG. 8.

The detailed structure of each accumulator 214.1~214.256 is shown in FIG. 9. Here, the structure of the accumulator 214.256 will be described as an example.

As shown in FIG. 9, an adder 241 sums the output "1" of the comparator 212.256, which is input as an enable signal ENA, and a feedback signal, and the summed signal is latched to a first latch 244 via an AND gate 242. The AND gate 242 is cleared by the frame synchronous signal (FRAME SYNC) input via an inverter 243.

A signal obtained by OR-operating the frame synchronous signal (FRAME SYNC) and the clock signal (CLK) in an OR gate 245 is input to a clock port of the first latch 244, and the first latch 244 feeds back the latched output as a feedback signal to the adder 241 and simultaneously outputs the latched output to the second latch 246 whenever the output of the OR gate 245 is equal to "1".

The second latch 246 receives the frame synchronous signal (FRAME SYNC) as a hold signal at a clock port thereof and outputs a value obtained by holding the output of the first latch 245, that is, the number of pixels having a gray level of "255" or less per frame during the CDF calculation area, according to the frame synchronous signal FRAME SYNC.

Figure 10:
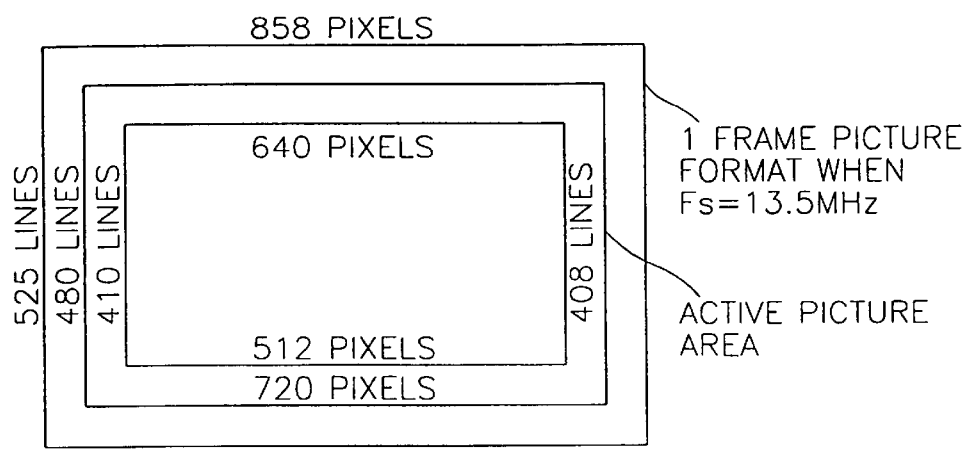
FIG. 10 is a diagram illustrating a CDF calculation area in one frame of the NTSC image, which is used in the present invention.

Here, in the CDF calculation area used in the present invention, only 640 pixels×204.8 lines per field among 720 pixels×480 lines effective pixels in the NTSC standard image (858 pixels×525 lines) of the NTSC CCIR 601 of FIG. 10 are used as a CDF calculation area for the histogram equalization.

Also, if the CDF is calculated using only $2^{18}$ (640×204.8× 2) pixels per frame, that is, by setting the number of total pixels n to $2^m$ (where m is an integer), the dividers 124.1~124.256 of the CDF calculator 120 shown in FIG. 5 are not required. Here, since it is difficult to design the logic of the divider, the designing of a circuit is simplified if the divider is omitted.

In FIG. 5, the whole image of 720 pixels×480 lines is used as the CDF calculation area, so that the number of total pixels n is equal to 720×480. That is, the number of total pixels cannot be expressed by $2^m$, so that dividers having the complicated design are necessary.

However, in order to calculate the CDF values of each gray level using the CDF calculator 210 of the present invention, all outputs of the accumulators 214.1~214.256, that is, from the number of pixels having a gray level of "0" per frame to the number of pixels having a gray level of "255" or less per frame, should be divided by the number of total pixels, respectively. However, the real meaning of the division by the number of total pixel n of $2^m$ is only to shift, so that a divider is not required.

Thus, values shifted by the number (here, 18) corresponding to the power of radix-2 with respect to all outputs from the CDF calculator 210, that is, from the number of pixels having a gray level of "0" to the number of pixels having a gray level of "255" or less per frame, are multiplied by the maximum gray level, respectively, and then the results are stored in the look-up table 220 of FIG. 7.

Here, a period for which the CDF value of new frame of the look-up table 220 is updated according to the frame synchronous signal (FRAME SYNC) corresponds to the vertical blacking period "d" of the first field as described with reference to FIG. 6B. Thus, the equalization output corresponding to the input pixel can be obtained by selecting a value stored in the look-up table 220 corresponding to the input pixel.

The present invention can be applied to a circuit having a structure which is simpler than that of the CDF calculator 210 of FIG. 7. According to the circuit having the simple structure, CDFs of the quantized gray level are calculated instead of the CDFs of each gray level from the minimum to the maximum, and then the obtained CDFs of the quantized gray level are interpolated to output the result.

INDUSTRIAL APPLICABILITY

As described above, in the histogram equalization apparatus of the present invention, a frame memory, an PDF calculator and dividers for the CDF calculation are omitted such that the histogram equalization function which could be applied to only a still image using the program operation can be applied to a moving image in a real-time processing with the simple structure.

What is claimed is:

1. A histogram equalization apparatus for a image expressed by a predetermined number of gray levels, comprising:
    a calculator for counting the number of pixels having a gray level from the minimum to the maximum or less with respect to an input image in a screen unit to calculate cumulative distribution function (CDF) values of each gray level; and
    a memory for updating histogram-equalized levels corresponding to each gray level of the input image in a screen unit based on the CDF value of each gray level of a previous screen unit, and outputting a corresponding histogram-equalized level according to a level of the input image;
    wherein the calculator comprises:
        a plurality of comparators for comparing whether the level of the input image is less than or equal to each gray level; and
        a plurality of accumulators for accumulating each output of the plurality of comparators to output the CDF values of each gray level from the minimum to the maximum or less per one screen unit.

2. The histogram equalization apparatus of claim 1, wherein the screen unit is a frame.

3. The histogram equalization apparatus of claim 1, wherein each accumulator accumulates the output of each comparator whenever a clock signal is input, and outputs an accumulated value and simultaneously clears the accumulated value according to a frame synchronous signal.

4. A histogram equalization apparatus for a image expressed by a predetermined number of gray levels, comprising:
    a calculator for counting the number of pixels having a gray level from the minimum to the maximum or less with respect to an input image in a screen unit to calculate cumulative distribution function (CDF) values of each gray level; and
    a memory for updating histogram-equalized levels corresponding to each gray level of the input image in a screen unit based on the CDF value of each gray level, and outputting a corresponding histogram-equalized level according to a level of the input image;
    wherein the calculator comprises:
        a plurality of comparators for comparing the level of the input image with each gray level; and
        a plurality of accumulators for accumulating each output of the plurality of comparators to output the CDF values of each gray level from the minimum to the maximum or less per one screen unit, wherein each accumulator accumulates the output of each comparator whenever a clock signal is input, and outputs an accumulated value and simultaneously clears the accumulated value according to a frame synchronous signal, and wherein the clock signal is generated according to a system clock signal and an area control signal representing a CDF calculation area.

5. The histogram equalization apparatus of claim 4, wherein the number of total pixels of a CDF calculation area is equal to $2^m$, where m is an integer.

6. The histogram equalization apparatus of claim 1, wherein the histogram-equalized levels stored in the memory are obtained by multiplying the CDF values of each gray level calculated by the calculator by the maximum gray level.

7. The histogram equalization apparatus of claim 5 wherein the histogram-equalized levels stored in the memory are obtained by shifting the values of each gray level from the minimum to the maximum or less by the number (m) corresponding to the power of radix-2, and then multiplying each shifted result by the maximum gray level.

8. A histogram equalization method for a image expressed by a predetermined number of gray levels, comprising the steps of:
    (a) counting the number of pixels having a gray level from the minimum to the maximum or less with respect to an input moving image in a screen unit to output a CDF value of each gray level; and
    (b) multiplying the CDF value corresponding to the level of a previous unit of the input moving image by the maximum gray level to output a histogram-equalized level;
    wherein the step (a) comprises the sub-steps of:
        (a1) comparing whether the level of the input image is less than or equal to each gray level from the minimum to the maximum or less; and
        (a2) accumulating compared results of the step (a1) in a screen unit to output all values from the number of pixels having a gray level from the minimum to the maximum or less per screen.

9. The histogram equalization method of claim 8 wherein the number of total pixels of a CDF calculation area is equal to $2^m$, where m is an integer.

10. The histogram equalization method of claim 8 wherein the screen unit is a frame.

11. A histogram equalization method for a image expressed by a predetermined number of gray levels, comprising the steps of:
    (a) counting the number of pixels having a gray level from the minimum to the maximum or less with respect to an input image in a screen unit to output a CDF value of each gray level; and
    (b) multiplying the CDF value corresponding to the level of the input image by the maximum gray level to output a histogram-equalized level, wherein the number of total pixels of a CDF calculation area is equal to $2^m$, where m is an integer, and wherein the histogram-equalized levels of the step (b) is obtained by shifting the values of each gray level from the minimum to the maximum or less by the number (m) corresponding to the power of radix-2, and then multiplying each shifted result by the maximum gray level.

* * * * *